United States Patent
Miyasaka et al.

(10) Patent No.: US 6,865,484 B2
(45) Date of Patent: Mar. 8, 2005

(54) SATELLITE POSITION MEASUREMENT SYSTEM

(75) Inventors: Koji Miyasaka, Tokyo (JP); Masakazu Mori, Tokyo (JP); Kazuyuki Sakaki, Tokyo (JP); Kenichi Takasu, Tokyo (JP); Yuji Kobayashi, Tokyo (JP)

(73) Assignees: Mitsui & Co., Ltd., Tokyo (JP); Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 10/343,916
(22) PCT Filed: Apr. 10, 2002
(86) PCT No.: PCT/JP02/03581
§ 371 (c)(1),
(2), (4) Date: Feb. 6, 2003
(87) PCT Pub. No.: WO02/084322
PCT Pub. Date: Oct. 24, 2002

(65) Prior Publication Data
US 2003/0154026 A1 Aug. 14, 2003

(30) Foreign Application Priority Data
Apr. 11, 2001 (JP) .......................................... 2001-112814

(51) Int. Cl.⁷ .............................................. G01C 21/26
(52) U.S. Cl. ....................... 701/213; 701/214; 701/215; 342/357.02
(58) Field of Search ................................. 701/213, 214, 701/215; 342/357.01, 357.03, 357.06, 357.12, 357.13, 357, 358, 357.02

(56) References Cited
U.S. PATENT DOCUMENTS

| | | | |
|---|---|---|---|
| 5,519,620 A | 5/1996 | Talbot et al. | |
| 5,602,741 A | 2/1997 | Talbot et al. | |
| 5,757,646 A | 5/1998 | Talbot et al. | |
| 5,890,091 A | 3/1999 | Talbot et al. | |
| 5,935,194 A | 8/1999 | Talbot et al. | |
| 6,061,632 A | 5/2000 | Dreier | |
| 6,233,523 B1 * | 5/2001 | Sood | 701/213 |
| 6,529,830 B1 * | 3/2003 | Eschenbach | 701/215 |
| 6,531,981 B1 * | 3/2003 | Fuller et al. | 342/357.03 |
| 6,618,671 B2 * | 9/2003 | Dooley et al. | 701/213 |
| 6,647,340 B1 * | 11/2003 | Pemble et al. | 701/214 |
| 6,671,620 B1 * | 12/2003 | Garin et al. | 701/213 |

FOREIGN PATENT DOCUMENTS

| | | |
|---|---|---|
| JP | 7-12918 A | 1/1995 |
| JP | 9-509489 A | 9/1997 |
| JP | 9-311177 A | 12/1997 |
| JP | 10-48321 A | 2/1998 |
| JP | 11-83976 A | 3/1999 |
| WO | WO 95/22769 A1 | 8/1995 |

OTHER PUBLICATIONS

U.S. Appl. No. 10/343,914, filed Feb. 6, 2003, inventor Miyasaka et al.

* cited by examiner

Primary Examiner—Richaerd M. Camby
(74) Attorney, Agent, or Firm—Foley & Lardner LLP

(57) ABSTRACT

A GPS positioning system that has: at least one mobile station to measure a positional coordinate by receiving radio wave from a satellite; a plurality of fixed stations that have predetermined positional coordinates and receive radio wave from the satellite; and arithmetic processing means, which is connected with at least one mobile station and a plurality of fixed stations via communication, and that transmits correction data suitable for the mobile station to the mobile station based on positioning data transmitted from the mobile station.

8 Claims, 4 Drawing Sheets

SATELLITE POSITION MEASUREMENT SYSTEM

BACKGROUND OF THE INVENTION

1. Technical Field of the Invention

The present invention relates to a GPS positioning system (Satellite positioning system) in which a positional coordinate can be found by receiving radio wave from a satellite, and a data server for GPS positioning.

2. Prior Art

Kinematic positioning in a GPS is a survey method where a pair of antenna and a receiver are arranged in a fixed manner at a reference point whose positional coordinate is known and another pair of movable antenna and receiver perform measurement in a short time while sequentially moving among a large number of survey points.

There exists a real-time kinematic positioning (hereinafter, referred to as an RTK) as a developed type of the kinematic positioning. The RTK is a positioning method where a position being a measurement result can be obtained in a real-time.

As shown in FIG. 6, a fixed station 2 that consists of antenna and receiver is arranged at the reference point whose coordinate is known and a mobile station 1 that consists of an antenna and a receiver performs measurement while moving it sequentially.

The RTK simultaneously receives radio wave from a plurality of satellites 8 with the fixed station 2 and the mobile station 1, analyzes positioning data in the mobile station 1 referring to positioning data obtained in the fixed station 2, and thus a relative coordinate from the known point of the fixed station 2 to a measurement point of the mobile station 1 immediately can be found.

Further, for transmission of the positioning data from the fixed station 2 to the mobile station 1, method of transmitting data from the fixed station 2 by particular frequency radio is used. Specifically the fixed station 2 was provided with a radio transmitter (one having the frequency of 400 MHz and the output of about 10 mW, for example) to transmit constantly the positioning data, and the mobile station 1 was equipped with a radio receiver capable of receiving the transmitted radio wave, and thus it has been able to refer to the transmitted positioning data as needed.

On the other hand, survey result of the GPS requires various kinds of correction according to a geodetic system and environment.

Specific correction items are listed as follows.

(1) Geoid correction (Correction of the geodetic system)

Geoid is 'One that matches mean sea level out of the equipotential surface of the gravity of the Earth'. Height used in public survey in Japan, that is, the Japan geodetic system is an elevation having the mean sea level (geoid surface) of Tokyo bay as a reference.

On the other hand, one that the GPS uses as a reference is the Earth ellipsoid (WGS-84), and the height to be found (WGS-84 system) is the height from the ellipsoid surface as well.

The Japan geodetic system and the WGS-84 system have the difference due to different definitions between them as large as about 50 m in height depending on an area. Therefore, a coordinate system needs to be converted in order to use a positional coordinate obtained by the GPS survey as the survey result in the Japan geodetic system.

Since the geoid has fine unevenness, an approximate ellipsoid of revolution is generally fitted to the Earth's surface, which set as a reference ellipsoid, and the distance of a perpendicular to the ellipsoid is generally set as an ellipsoid height (h). Note that the Bessel ellipsoid is used as the reference ellipsoid in Japan.

Incidentally, assuming h is the ellipsoid height and H is the elevation, it follows that 'h=H+N' (refer to FIG. 4), and N in the equation is called a geoid height.

Accordingly, the elevation H can be obtained by subtracting the geoid height N from the ellipsoid height h obtained by the GPS positioning.

The geoid height and parameter for coordinate system conversion are found for each area, and by obtaining the geoid height and the coordinate conversion parameter that correspond to the area, positional coordinate value that conforms to the Japan geodetic system can be obtained from the positioning result by the GPS.

(2) Information regarding satellite

Although satellites used for the GPS have been launched to cover all over the Earth, their existence density or the like is scattered. In the case where satellites gather in a portion of an all-sky viewed from an antenna, in other words, when the positions of the satellites whose radio wave is receivable in the all-sky are distributed unevenly, measurement accuracy in analyzing a measurement position deteriorates.

Furthermore, when an obstacle or the like exists around the antenna, a satellite may exists from which radio wave cannot be received depending on the time.

Conventionally, before setting out for a measurement operation, arrangement information of the GPS satellites has been processed on a personal computer or the like after the obstacle viewed from an observation point was predicted, and thus the time unsuitable for the measurement operation had to be set.

(3) Information regarding ionosphere and weather

Furthermore, since the RTK performs analysis based on radio wave from the satellite, which is received by both of the fixed station and the mobile station, the influence to the accuracy of a coordinate value found by the analysis becomes measurable if the condition of the ionosphere and the atmosphere, in which each radio wave passes until it reaches the Earth, changes considerably.

For this reason, taking in consideration the condition of the earth viewed from the satellite, a range having the radius of about 10 km around the fixed station is generally set as a range in which the condition of the ionosphere and the atmosphere, in which radio wave from the satellite passes, is regarded to be substantially the same. This range is a range where the mobile station can refer to the predetermined fixed station (hereinafter, a fixed station reference range) to maintain measurement accuracy as the RTK.

Consequently, a correction value for influence caused by the condition of the ionosphere and the atmosphere in the route, where radio wave passes until it reaches the earth, is transmitted to each mobile station, and thus the RTK positioning can be performed even outside the fixed station reference range.

Correction items concerning the condition of the ionosphere and the atmosphere are called 'The atmosphere model'.

Specifically, it corrects the traveling direction and the difference in speed of radio wave caused by the condition of the atmosphere that exists between the satellites and the observation points (both of the fixed station and the mobile station), which is the density or the like, for example. By applying 'the appropriate atmosphere model' between the satellites and the mobile station and the fixed station severally, propagation speed of radio wave can be accurately known and the accuracy of positional analysis for the mobile station can be thus improved.

Correction regarding the weather information is also important to improve positioning accuracy as a similar one.

Basically, each correction operation in the GPS has not been performed during the positioning operation, but it has generally been prepared before the operation based on a plan or correction has been made to data after the positioning operation.

However, unlike static positioning performed by fixing the antenna, in kinematic positioning having the premise that the positioning operation is performed while moving the antenna, there have been many cases where positioning operation was difficult at a point where positioning was originally planed or where an operator could not deal flexibly with changes of the environment and the condition at an operation site because they are difficult to predict.

Further, when a problem is found in the positioning result as a result of performing correction of the geoid or the like, its verification is impossible in the case where a cause of error positioning is based on the site condition. Accordingly, the problem due to the same cause is very likely to happen even if the positioning operation is performed again, and there is no way to recognize it.

In addition, when radio is used in transmitting the positioning data, the receiving frequency of the receiver was required to previously synchronize with a transmitting frequency of the fixed station to be referred to before the positioning operation.

On the other hand, in the case where the positioning operation is performed on the RTK, a fixed station had to be newly installed or the positioning operation had to be performed with reduced accuracy when a planed point of positioning is off from the fixed station reference range.

Moreover, there exists a 'virtual reference station' method in which highly accurate RTK can be performed even outside a reference-possible range of each fixed station. However, the 'virtual reference station' that is a virtual fixed station must be set in advance in a predetermined range set by a plurality of the fixed stations, and treatment of the 'virtual reference station' is substantially the same as that of the foregoing fixed station.

SUMMARY OF THE INVENTION

The object of the present invention is to provide a GPS positioning system (Satellite positioning system) that can deal flexibly with a change of an operation site when the site is changed at the point of positioning operation, and a data server for GPS positioning.

The solving means of the present invention is described in the foregoing claims.

PREFERRED EMBODIMENTS OF THE INVENTION

The preferred embodiments of the invention will be described as follows based on the drawings.

Figure 1:
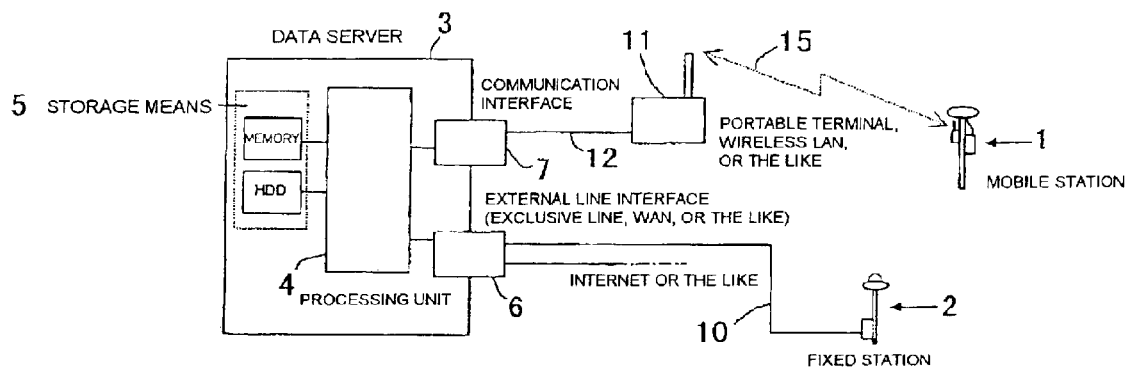
FIG. 1 is an entire view of a GPS positioning system according to an embodiment of the present invention.
Figure 2:
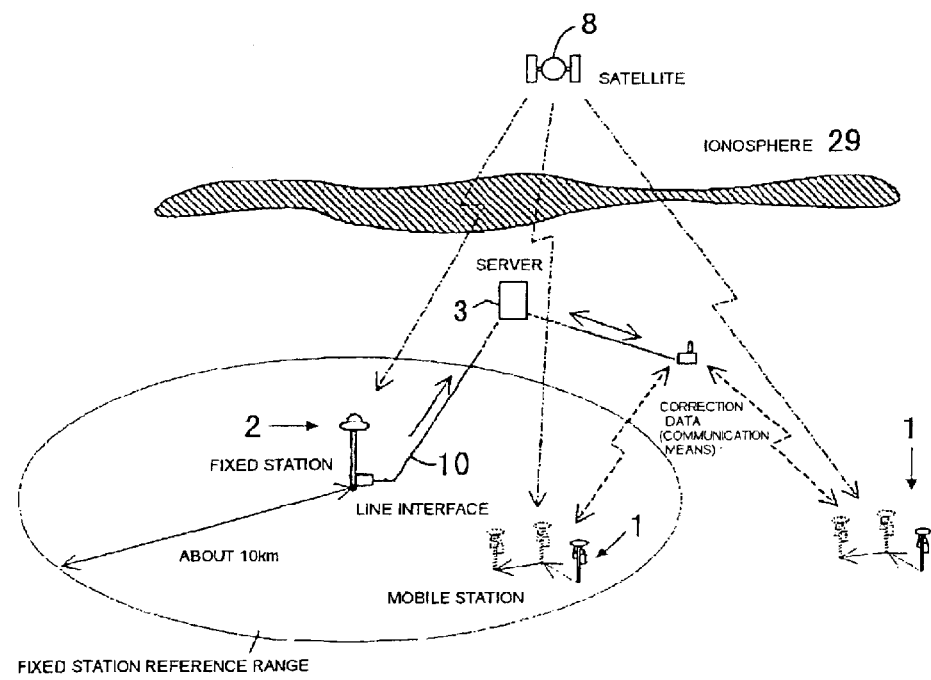
FIG. 2 is a view showing the basic concept of the present invention.

FIG. 1 is the entire configuration view showing an embodiment of the satellite positioning system according to the present invention.

The satellite positioning system according to the present invention consists of at least one mobile station 1, a plurality of the fixed stations 2, and an arithmetic processing unit (a data server 3, preferably) connected with the mobile station 1 and the fixed stations 2 via communication means.

The data server 3 consists of a central processing unit 4, a storage means 5, an interface units 6, 7 and the like.

The mobile station 1 has: a receiving antenna 20; a receiver 21; communication means 22 capable of two-way communication with the data server 3 (or an interface connectable with the communication means); and display means (not shown) capable of displaying various kinds of information for the operator.

The receiver 21 of the mobile station 1 has storage means (not shown) that stores data such as the positioning data and analysis result, and additionally has the display means built therein. These equipments have portability such that the operator can carry them and are capable of operating independently using a battery as a power source. Although a chemical secondary battery is generally used as the battery, a physical battery by an electric double layer capacitor (Energy Capacitor System) is desirable due to a stable output and a lifetime because performance deterioration is small as well.

Further, a sensor that detects weather condition or a CCD sensor having an optical system, which photographs the site of positioning operation to obtain as image information also can be equipped.

Data obtained by the sensors can be transmitted to the data server 3 together with the positioning data via the communication means.

As the equipment for the positioning operation, the antenna 20 is installed on the rod member 23. The rod member 23 has a bubble tube capable of detecting perpendicularity in order to be installed accurately on a vertical line of the measurement point, the antenna 20 can be installed on its upper end, and its lower end is pointed so as to be installed accurately and easily on the positioning point.

The lower end of the rod member 23 is placed on the positioning point to maintain the perpendicular state by the bubble tube or the like, and thus the antenna 20 can be arranged accurately above the positioning point.

The fixed station 2 has: a receiving antenna 17; a receiver 19; and communication means 10 that transmits correction positioning data obtained by the positioning to the data server 3.

The fixed station 2 is arranged on a point whose positional coordinate is known in a fixed manner, receives radio wave from the satellites constantly or periodically, and obtains the correction positioning data regarding an installed position.

The communication means 10 transmits the correction positioning data obtained to the data server constantly or periodically.

In the communication means 10, since the fixed station 2 is arranged at a known position in a fixed manner and the means 10 is capable of communicating the correction positioning data in high-speed, an always-on connection line such as a WAN and an exclusive line is preferable from the viewpoint of speed and stability.

Further, the correction positioning data of the fixed station 2, which is transmitted to the data server 3, is generally transmitted on a data format called a CMR where the receive data from the satellites 8 and the known coordinates are combined.

In the case of the CRM, it is referred to when the position of the mobile station 1 is analyzed highly accurately in the RTK positioning.

The data server 3 consists of the central processing unit 4, the storage unit 5, the interface unit that connects the communication means 10, 15 and the like.

The interface unit includes: an external line interface (first interface 6) that is in an always-on connection state in order to receive positioning data from each of a plurality of the fixed stations 2; and a communication interface (second interface 7) capable of two-way communication in order to transmit/receive data to/from at least one mobile station 1.

The first interface 6 for the external line is connected to the communication means 10, which is between the interface and the fixed station 2, in order to receive the correction positioning data sent from the fixed station 2.

Furthermore, the first interface 6 for the external line is capable of connecting to a network such as the Internet other than the fixed station 2, which enables it to communicate with a personal computer or the like in a remote place via this line.

The second interface 7 for communication is used for receiving the positioning data from the mobile station 1 and output data from the sensor equipped thereto and for transmitting the correction positioning data and reference data from the data server 3.

Figure 3:
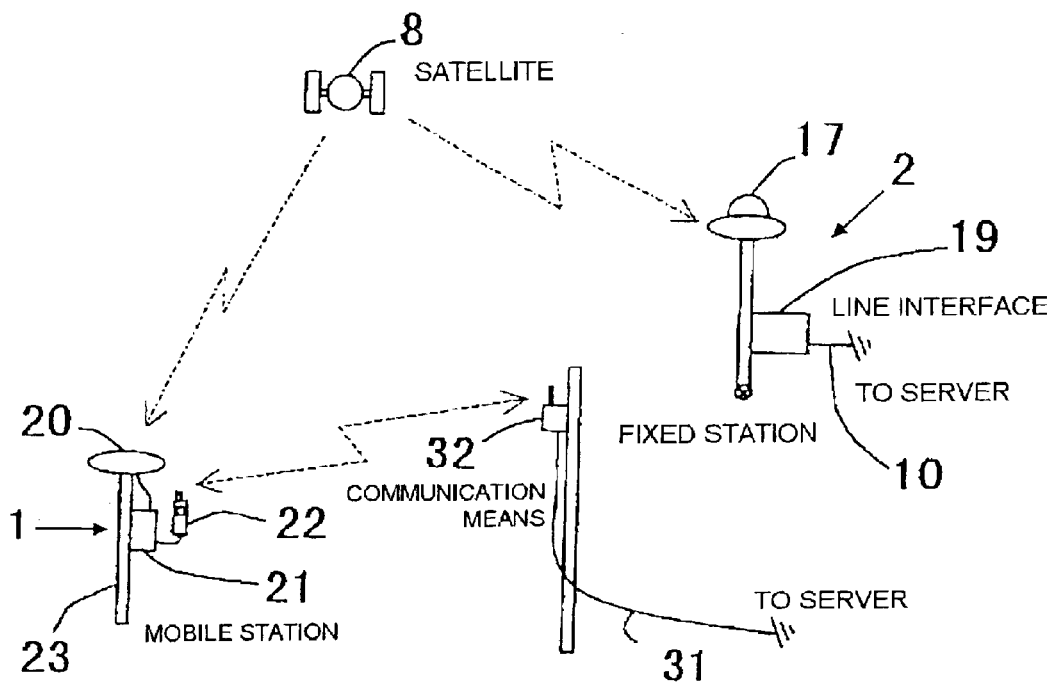
FIG. 3 shows a status where the GPS positioning system according to an embodiment of the present invention is used at a site.
Figure 4:
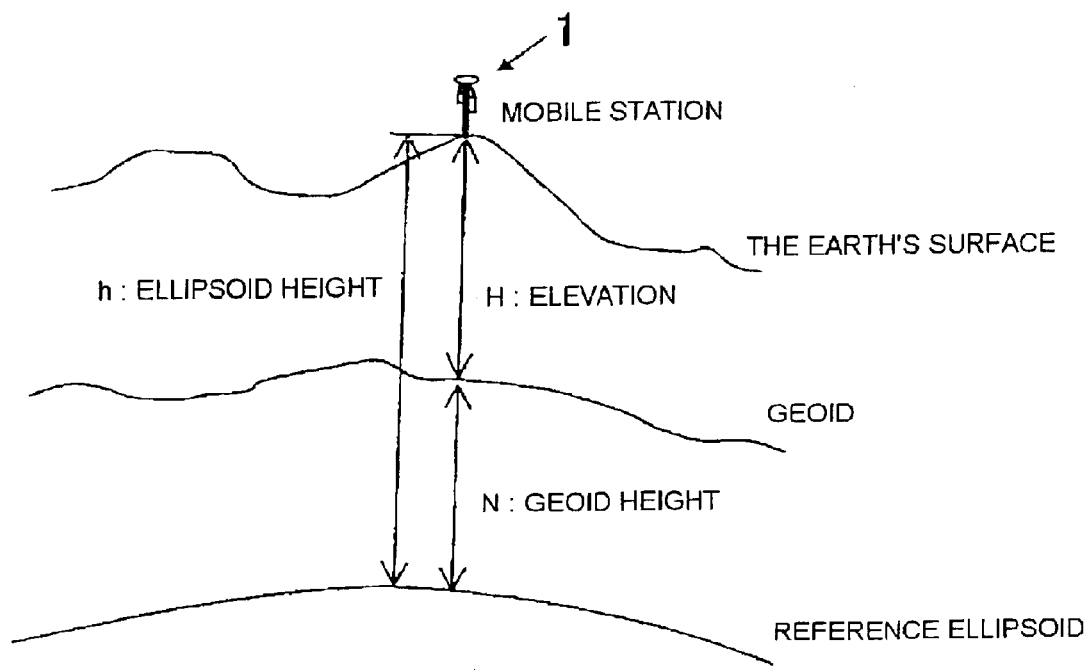
FIG. 4 is a view explaining geoid correction.

As a receiving function, transmission/receiving is performed between the communication means 22 (FIG. 3) of the mobile station 1 and the communication means 11 such as a portable terminal and a wireless LAN connected to the data server 3 with a line 12 as shown in FIG. 1 for example, and between the communication means 22 included in the mobile station 1 and communication means 32 connected to the server 3 with a line 31. The mobile station 1 receives radio wave from the satellites 8 to obtain the positioning data. Alternatively, the mobile station 1 receives positional information data calculated in a simple method based on the positioning data.

As a transmission function, the interface 7 transmits the correction positioning data based on the positioning data from an appropriate fixed station 2, which is used for analysis, to the mobile station.

Further, regarding the communication means 11 in the communication interface 7, since positioning is performed while the mobile station moves within a survey range, means capable of wireless communication (two-way communication) such as a cellular phone, a PHS (Personal Handyphone System) and a wireless LAN is desirable.

Incidentally, time lag at the point of analysis in the mobile station 1 can be minimized when high-speed communication means is used as the communication means 11.

The central processing unit 4, receiving the positional information of the mobile station 1 from the positioning data of the mobile station 1 obtained via the communication interface 7, selects one fixed station 2 most suitable for the mobile station 1 based on the positional information, and transmits the correction positioning data received from the fixed station selected or the reference data corresponding to the positional information to the mobile station 1.

The storage means 5 is capable of storing flexibly various data received from the mobile station 1 and various information or the like regarding a person who performs positioning operation and a user, other than data necessary for the processing on the central processing unit 4. Specifically, it stores a survey operation range, environmental information of the mobile station or the like, other than the positional information of the fixed station 2, the positioning data to be received, and the positioning data or the positional information from the mobile station 1, and they can be utilized later.

Note that the positioning data in this case is a generic name of data of a format defined in satellite survey, which is data that could be dealt with such as receive data or positional information after analysis. Binary data, text data and the like are included as a format.

A specific survey operation will be described based on a preferred example.

(1) Initializing and setting the mobile station.

With the operation procedure of a general kinematic survey, the mobile station is arranged at the reference point to perform initializing operation.

At this point, communication setting, confirmation of communication condition, or the like is performed between the communication means 22 equipped on the mobile station 1 and the communication interface 7 for the server 3.

(2) Single positioning is performed receiving radio wave from the satellites 8 while the mobile station 1 is moved based on the positioning plan. The positional information obtained by the single positioning basically has an error of 20 m to 100 m.

The mobile station 1 transmits the positioning data obtained by the single positioning to the data server 3 via the communication means 22. At this point, the positioning data sent from the mobile station 1 is transmitted on a format called an NMEA standardized in the GPS.

Furthermore, when there exists information that the sensor equipped on the mobile station 1 has obtained, it is transmitted to the data server 3 together with the positioning data if necessary. For example, in the case of photographed image data of photograph means that consists of the optical system and the CCD sensor, which has been obtained together with the positioning, the image data is transmitted after correlated with the positioning data, and thus it can be treated as the photographed image on the positional coordinate. At this point, if the optical axis direction of the photograph means is detected and transmitted with the photographed image data, it can be treated as landscape from a positioning position.

(3) The data server 3 receives the single positioning data transmitted from the mobile station 1 via the communication interface 7.

The data server 3 receives the correction positioning data, which has been obtained by receiving radio wave from the satellites 8, from a plurality of the fixed stations 2 via the first interface 6 for external line.

The correction positioning data is generally in the 'CMR' format where the receive data and the positional coordinates of the fixed stations 2 are combined.

The data server 3, in the central processing unit 4, selects the fixed station 2 arranged in an appropriate position for the current position of the mobile station 1 based on the positional information in the positioning data from the mobile station 1.

On selecting the fixed station 2, the processing unit 4 transmits the reference data, which has been received from the selected fixed station 2 via the first interface 6, as the correction information at the point of positional analysis to the mobile station via the second interface 7.

(4) On the other hand, the processing unit 4 reads out the reference data relevant to the positional information of the mobile station 1 from the storage unit 5.

The reference data read out is transmitted to the mobile station 1 together with the correction positioning data from the fixed station 2.

Type of the reference data read out is selected according to the positioning operation. It may be set before the positioning operation, or may be determined according to the environment condition or the like assumed from a request from the mobile station 1 and a sensor output from the mobile station 1.

(5) The mobile station 1 receives the correction positioning data and the reference data from the appropriate fixed station 2, which have been transmitted from the data server 3, analyzes the correction positioning data together with the positioning data obtained by the single positioning, and thus more highly accurate positional information of approximately 10 mm can be obtained.

Moreover, by applying the reference data to the positional information obtained in this manner, even more excellent result of the positional information or the like that conforms to the Japan geodetic system can be obtained due to the correction regarding the geoid. Since the result obtained at this point is the same geodetic system as a survey result by a surveying instrument having a bench mark or the like as a reference, the results can be easily compared with each other.

The result obtained is stored in the storage means equipped on the mobile station 1, and processing such as creating a map may be performed after the operation ended in another place. Further, the communication means 22 of the mobile station 1 may transmit the data server 3 or other positioning result to a place where processing can be performed.

In the case where the reference data is data concerning the satellites 8, the time when measurement is impossible due to arrangement state of the satellites 8 is set upon checking an obstacle (ionosphere 29, for example) is actually at the site of positioning operation.

Further, since the mobile station has data regarding the satellites 8 and can predict the state where it loses track of the satellites 8, it calls attention to the operator beforehand.

In addition, the system constantly monitors server's 3 own operation status, the system detects any trouble if it occurs on hardware and software, and its information is transmitted to the operator of the mobile station 1 via the communication means.

For example, even if a trouble occurs such as reaction delay due to an increase of data processing amount in the server 3 and shortage of the correction positioning data due to deterioration of line environment, the mobile station 1 receives it as information to display on the display unit or inform it to the operator by blinking of an indicator, an alarm sound, or the like.

The operator, by obtaining the information earlier, can easily take countermeasures to the status.

Furthermore, the data server 3 acquires the weather information obtained from Japan Meteorological Agency and geographical information obtained by a GIS or the like via the external line, the information that corresponds to the position of the mobile station 1 is transmitted to the mobile station 1 via the communication means 11.

On the other hand, the mobile station 1 can be equipped with the photograph means. The photograph means consists of a CCD imaging element, an optical system that allows incident light to form an image on the receiving plane of the CCD imaging element, and an arithmetic control unit that processes the image formed on the receiving plane of the CCD as image data.

The image data is subject to compression processing taking in consideration load to the line during transmission, and transmitted to the data server 3 together with the positioning data via the communication means 15.

Further, photographing conditions at this point is converted into data and may be added to the image data when it is transmitted.

Additionally, if the positional coordinate of the positioning data transmitted from the mobile station 1 is remote from any of the fixed stations 2 connected to the data server 3 for 10 km or more and the correction positioning data cannot be transmitted, the data server 3 transmits information regarding the ionosphere 29 and weather that correspond to the position of the mobile station 1 together with the correction positioning data from the nearest fixed station 2 upon selecting the correction positioning data from the nearest fixed station 2. Accordingly, the RTK survey can be performed because the influence from the ionosphere 29 is eliminated.

Figure 5:
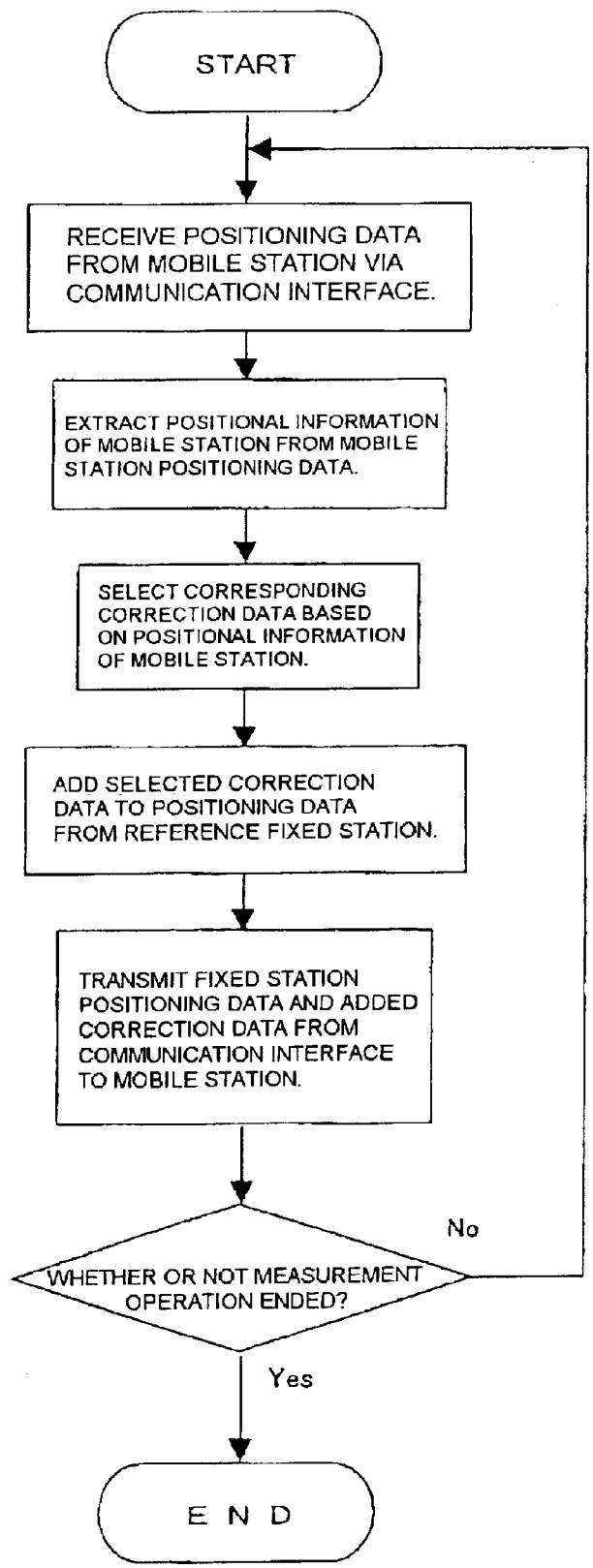
FIG. 5 shows a process flow chart of a data server of the present invention.
Figure 6:
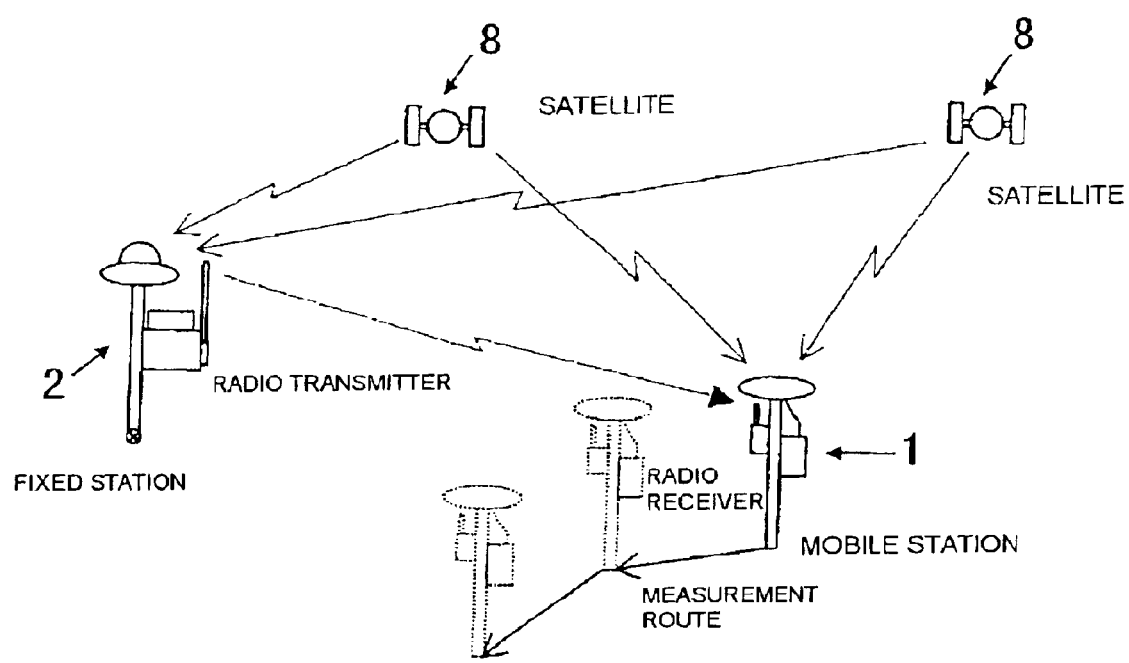
FIG. 6 shows a conventional GPS positioning system.

FIG. 5 shows the process flowchart in the data server 3 of the present invention.

Examples of data (information) to be transmitted are as follows.

The atmosphere model data

The geoid correction data

The satellite positional information data

Not only information regarding the positioning, but also operation information of the server, various kinds of information regarding the current position of the mobile station such as cautionary information concerning weather and information concerning adjacent facilities, for example, is sent as information that supports the positioning operation.

According to the present invention, the data server can provide the position of the mobile station based on the single positioning and various data in accordance with environment for the mobile station, and highly accurate measurement can be easily performed.

At the point of the RTK survey, appropriate reference data can be obtained in real time corresponding to the observation point. Therefore, highly accurate positioning operation without failure can be easily performed.

When data regarding the geoid correction is obtained at the site of positioning operation, correction regarding the geoid, which has conventionally been processed after the positioning operation ended, can be made at the positioning operation site. Accordingly, the positioning result concerning the Japan geodetic system can be checked at site. Further, verification is easier if other survey means is available.

Even if a problem occurs in the positioning result, the problem can be recognized at site and response such as re-positioning is easy, and the cause of the problem can be identified easily.

On the other hand, when information regarding the satellites can be obtained at site as well, not conventional setting based on an uncertain element such as a predicted obstacle but setting of the time that is not suitable for positioning operation can be made based on an obstacle actually checked at the positioning operation site, and thus a mistake and a problem in the positioning operation can be prevented.

Furthermore, when operation information of the server, various kinds of information regarding the current position of the mobile station such as cautionary information concerning weather and information concerning adjacent facilities, for example, can be checked as information that supports the positioning operation at the positioning operation site, the positioning operation can be performed certainly and load of the operator can be lightened.

Moreover, when transmission of the atmosphere model data as information regarding the ionosphere and weather depending on the position of mobile station is made possible, the correction positioning data from the fixed station is not limited to a reference possible range that is within the radius of 10 km around an effective fixed station, which has conventionally been regarded as the range where the RTK positioning is possible, and thus highly accurate RTK positioning can be performed.

What is claimed is:

1. A GPS positioning system, comprising:
    at least one mobile station for kinematic positioning, that measures a positional coordinate by receiving radio wave from a satellite;
    a plurality of fixed stations each having predetermined positional coordinates and receiving radio wave from the satellite; and
    arithmetic processing means connected with the mobile station and the fixed stations via communication, wherein geoid correction data suitable for the mobile station are transmitted to the mobile station on the basis of positioning data transmitted from the mobile station.

2. The GPS positioning system according to claim 1, wherein the arithmetic processing means comprises means for transmitting reference positioning data from an appropriate one of the fixed stations, which is selected out of a plurality of reference fixed positioning means, on the basis of the positioning data transmitted from the mobile station, together with the geoid correction data.

3. The GPS positioning system according to claim 1, wherein the mobile station includes an antenna and a receiver which are movable.

4. A data server for GPS positioning, comprising:
    a communication interface that receives positioning data from a mobile station for kinematic positioning, whose positional coordinate is measured by receiving radio wave from a satellite;
    a line interface whose positional coordinate is fixed at a known point, and that receives positioning data from a plurality affixed stations that receive radio wave from the satellite;
    storage means that stores data regarding correction; and
    arithmetic processing means that reads suitable geoid correction data from the storage means and transmits the geoid correction data to the mobile station on the basis of the positioning data received via the communication interface.

5. The data server for GPS positioning according to claim 4, wherein the mobile station includes an antenna and a receiver which are movable.

6. The GPS positioning system according to claim 2, wherein the arithmetic processing means further comprises means for determining whether or not the mobile station is at least a predetermined distance away from each of the fixed stations, and for also outputting ionospheric data and weather data to the mobile station together with the reference positioning data and geoid correction data, in that event.

7. The GPS positioning system according to claim 6, wherein the ionospheric data and the weather data are not output to the mobile station when the mobile station is determined to be closer than the predetermined distance away from at least one of the fixed stations.

8. A GPS positioning method comprising:
    a) placing a mobile station at a reference point, and establishing a communications link with a data server disposed at another location;
    b) performing single positioning by the mobile station receiving radio waves from a plurality of GPS satellites while the mobile station is moved to different positions, and by the mobile station transmitting positioning data obtained from the single positioning to the data server via the communications link;
    c) receiving, by the data server, the single positioning data transmitted by the mobile station via the communications link;
    d) receiving by the data server, correction positioning data which is obtained by receiving radio waves from the GPS satellites, from a plurality of fixed stations that are fixed in position at fixed positional coordinates;
    e) selecting, by the data server, one of the plurality of fixed stations as an appropriate fixed station for the mobile station, the selecting being based on the positioning data transmitted by the mobile station to the data server;
    f) transmitting, by the data server to the mobile station as reference data at a point of positional analysis, the correction positioning data obtained from the one of the plurality of fixed stations; and
    g) at a same time as step f), transmitting, by the data server to the mobile station, geoid correction data relevant to the positioning data of the mobile station; and
    h) computing, by the mobile station, higher-accuracy position information based on the geoid correction data and the correction positioning data of the one of the fixed stations.

* * * * *